Patented June 26, 1951

2,558,584

UNITED STATES PATENT OFFICE 2,558,584

PROCESSING OF SYNTHETIC RUBBERS WITH OILY ORGANOPOLYSILOXANE

Moyer M. Safford, Schenectady, N. Y., assignor to General Electric Company, a corporation of New York No Drawing. Application May 29, 1946, Serial No. 673,149

8 Claims. (Cl. 260—29.1)

This invention is concerned with new compositions of matter and methods for obtaining the same. More particularly, the invention relates to a process for reducing the excessive stickiness of synthetic rubber during processing on milling rolls without materially reducing the tackiness of the rubber, which process comprises incorporating in the synthetic rubber an amount of a liquid organopolysiloxane, e. g., a liquid methyl (mono- or dimethyl) polysiloxane, equal to from about 0.01 to 0.10 per cent, by weight, of the synthetic rubber.

During the processing of synthetic rubber on milling rolls, whether it be for the purpose, e. g., of breaking down the fiber structure of the rubber molecules or incorporating in the rubber various modifying ingredients, e. g., fillers, pigments, vulcanizing agents, accelerators, etc., considerable difficulty is often encountered in preventing sticking of the rubber to the rolls thereby preventing the formation of a smooth sheet which can be easily worked on the rolls. This sticking manifests itself by gumming up the rolls to such a point that the rubber is removed from the rolls only with the greatest difficulty. This difficulty of sticking to the rolls is encountered in many cases even when fillers or pigments are already present in the synthetic rubber.

Several methods have been proposed for overcoming the aforementioned difficulty. One of these comprises incorporating metallo-organo compounds, e. g., zinc stearate, aluminum stearate, calcium stearate, etc., in the base stock (synthetic rubber) in an amount equal to from 0.5 per cent to 2 per cent, or even as high as 3 or 4 per cent, by weight, based on the weight of the base stock. Although the employment of such materials has in some measure alleviated the undesirable degree of sticking to the rolls, several disadvantages accompany their use. For example, zinc stearate when incorporated in synthetic rubber for the above-mentioned purpose also decreases the tackiness of the rubber. This is a serious defect, since the presence of tackiness or tack (usually defined as the tendency of two layers of synthetic rubber to adhere to each other when pressed together) in synthetic rubber is a desirable asset in the manufacture of many rubber articles. Inasmuch as synthetic rubbers are notoriously inferior to natural rubber with regard to such property (tackiness), any material incorporated in the synthetic rubber which decreases this property introduces another problem in the processing of such rubber.

Moreover, the use of such materials as calcium stearate or zinc stearate has the additional disadvantage of introducing into the synthetic rubber a foreign material which, although present in small amounts, tends to deteriorate the properties of the synthetic rubber and changes its characteristics. Furthermore, the presence of some of these foreign agents (for instance, calcium stearate, etc.) poses the additional possibility that the electrical properties of the synthetic rubber will be made inferior by the presence of salts formed from the reaction of the organometallic compounds with other foreign matter present in the synthetic rubber or resulting from the decomposition of the synthetic rubber. This is especially true in the case of polymers of 2-chloro-1,3-butadiene which may liberate hydrogen chloride capable of reacting with the metallo-organo compounds, e. g., calcium stearate, to yield calcium chloride, the presence of which would seriously affect the electrical properties of the synthetic rubber.

By the term "synthetic rubber" as used herein and in the appended claims is intended to mean and include products which are related chemically to natural rubber, have many of the properties of natural rubber, e. g., are vulcanizable, but which are prepared from monomeric organic substances containing conjugated double or triple bonds or copolymers involving these materials. With the increased production and use of synthetic rubbers, there have arisen many definitions of the term "synthetic rubber" (the term "elastomer" has been used interchangeably with the term "synthetic rubber"). For a more complete discussion of the term "synthetic rubber," attention is directed to Harry Barron's "Modern Synthetic Rubbers" published by D. Van Nostrand Company, Inc., New York (1944).

More specific examples of synthetic rubbers which may be considered as falling within the aforementioned definition are rubbery polymers of butadiene, rubbery copolymers of butadiene and other copolymerizable materials, for example, rubbery copolymers of butadiene and styrene (GR-S), butadiene and acrylonitrile, butadiene and a preponderant amount of isobutylene (GR-I), rubbery polymers of 2-chloro-1,3-butadiene or chloroprene (GR-M), rubbery polymeric condensation products of organic dihalides and inorganic polysulfides, etc.

I have discovered that the undesirable sticking of the synthetic rubber to the milling rolls during processing can be reduced without any apparent reduction in the tackiness of the synthetic rubber by incorporating therein a liquid organopolysiloxane which is oily and non-resinous, more particularly a liquid hydrocarbon-substituted polysiloxane, for example, a liquid dimethyl polysiloxane. The amount of the organopolysiloxane necessary is very small, namely, from about 0.01 to 0.10 per cent, by weight, of the synthetic rubber. Because of the small amount used, the properties and characteristics of the synthetic rubber (tackiness, strength, flexibility, etc.) remain unchanged. Furthermore, because of the outstanding electrical properties of the organopolysiloxanes, the presence of these compounds in the synthetic rubber adds to rather than detracts from the electrical properties of the original synthetic rubber.

The liquid organopolysiloxanes employed in the practice of this invention contain organic radicals, more specifically hydrocarbon radicals, attached to silicon through a carbon atom and whose silicon atoms are joined to other silicon atoms by oxygen atoms, as for example, Si—O—Si. These compounds may be prepared either by hydrolysis of hydrolyzable organosilanes and condensation of the hydrolyzed products or by hydrolysis of a mixture of different hydrolyzable organosilanes and condensation of the hydrolysis products. By hydrolyzable organosilanes I mean derivatives of SiH$_4$ which contain readily hydrolyzable radicals such as hydrogen, halogens, amino groups, alkoxy, aroxy, and acyloxy radicals, etc., the remaining valences of the silicon atoms being satisfied by organic radicals that are joined to the silicon atoms through carbon atoms. Examples of such organic radicals are as follows: methyl, ethyl, propyl, amyl, heptyl, isopropyl, and higher; alicyclic radicals, e. g., cyclopentyl, cyclohexyl, etc.; aryl and alkaryl radicals such as phenyl, naphthyl, anthracyl, tolyl, xylyl, mesityl, etc.; aralkyl such as benzyl, phenylethyl, etc.; alkenyl such as allyl, methallyl, etc., and heterocyclic radicals. The above radicals, if desired, may also contain inorganic constituents, e. g., halogens, etc. Preferably the organic radical joined to the silicon atom through carbon atoms is a lower alkyl radical, more particularly a methyl (—CH$_3$) radical.

More specific methods for preparing the aforementioned liquid organopolysiloxanes, including the liquid methyl polysiloxanes (e. g., liquid polymeric dimethyl silicones) may be found, for instance, in the copending applications of Winton I. Patnode, Serial Nos. 463,813 (now abandoned), 463,814 (now U. S. Patent 2,469,888, issued May 10, 1949), and 463,815 (now abandoned), all of which applications were filed October 29, 1942, and Wilcock application Serial No. 656,162 now U. S. Patent 2,491,843, issued December 20, 1949, and Sauer applications Serial Nos. 656,163 and 656,164, filed March 21, 1946. All the foregoing applications have been assigned to the same assignee as the present invention. Hyde Patent 2,377,689, issued June 5, 1945, also discloses additional methods for the preparation as well as the properties of various liquid organopolysiloxanes containing an average of from 1.98 to less than 3.0 organic groups per silicon atom which may be employed in the practice of the present invention.

The term "liquid methyl polysiloxane" includes, for example (1) compositions comprised substantially of a mixture consisting of liquid polymeric dimethyl silicones represented by the formula [(CH$_3$)$_2$SiO]$_x$ of average molecular weight such that $x$ in said formula is at least 10 (see application Serial No. 463,815, supra), (2) liquid methyl polysiloxanes having the general formula

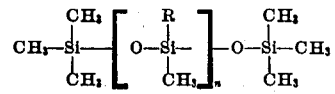

wherein R represents either hydrogen or a methyl radical and $n$ stands for a positive integer, and (3) liquid methyl polysiloxanes in which all or substantially all of the silicon atoms are each connected to two methyl groups.

In order that those skilled in the art better may understand how the present invention may be practiced, the following examples are given by way of illustration and not by way of limitation. All parts are by weight.

Example 1

About 200 parts of a rubbery copolymer of butadiene and acrylonitrile was rolled at room temperature on differential rubber rolls. After several minutes' rolling, the synthetic rubber had spread itself on the rolls in a gummy fashion. Because of this condition of the rubber on the rolls, the material stuck to the rolls and resisted all efforts to remove it as a homogeneous sheet except by scraping the rolls with a sharp-edged instrument. The incorporation of various fillers and modifying ingredients alleviated this condition only slightly. Because of the condition of the synthetic rubber on the rolls it was difficult to effect normal sheeting and processing of the material.

Example 2

200 parts of the aforementioned copolymer (Example 1) was rolled on the differential rolls in the same manner as in Example 1, and about 0.04 part of a liquid dimethyl polysiloxane (containing approximately 1.98 methyl groups per silicon atom) prepared according to the method disclosed in application Serial No. 463,814 (supra) was added to the synthetic rubber on the rolls. After an additional rolling of about two minutes, during which time the liquid polysiloxane was intimately dispersed in the mass on the rolls, a smooth sheet was formed which, although it adhered satisfactorily to the rolls, was not sticking to the rolls in the gummy manner prior to the addition of the liquid dimethyl polysiloxane. In addition, the sheet on the rolls could be worked in the manner necessary to obtain good dispersion of the various ingredients which are usually incorporated in the processing of synthetic rubber. Finally, the sheet could be removed from the rolls in one homogeneous piece without the necessity of scraping it from the rolls. When a sample of this rolled sheet was bent back on itself, it exhibited good tackiness as evidenced by the force necessary to separate the adhered parts.

Example 3

In this example, 200 parts of neoprene and of GR-S were each rolled on the differential rubber rolls as was done in Example 1. In each case, about 0.04 part of the liquid dimethyl polysiloxane used in Example 2 was added to the sticky, gummy mass present on the rolls. In both instances, the sticking and gumming on the rolls was sufficiently decreased to permit proper sheeting and processing of the specific synthetic rubber on the rolls without reducing the tackiness of the respective synthetic rubber.

Although the foregoing examples show the use of a liquid dimethyl polysiloxane, it is to be understood by those skilled in the art that other liquid hydrocarbon-substituted polysiloxanes may be employed. These include, for example, liquid mono- and diethyl polysiloxanes, mono- and dipropyl polysiloxanes, methyl ethyl polysiloxane, phenyl polysiloxanes, methyl phenyl polysiloxane, ethyl phenyl polysiloxane, tolyl polysiloxanes, benzyl polysiloxanes, etc. In the preferred embodiments of this invention, liquid hydrocarbon-substituted polysiloxanes containing an average of from 1.98 to 2 hydrocarbon radicals substituted on each silicon atom are used in which the hydrocarbon radical is the methyl (—CH$_3$) radical, especially where the ratio of methyl groups to silicon atoms, i. e., the average number of methyl groups substituted on each silicon atom, is within the limits of 1.98 to 2 methyl groups per silicon atom.

The amount of liquid organopolysiloxane employed to overcome the sticking of the synthetic rubber to the rolls is important. If too much is incorporated in the synthetic rubber, the formed sheet will have practically no adherence to the rolls with the result that it will slip completely from the rolls, thereby preventing the incorporation of the various fillers and ingredients usually added in the processing of synthetic rubber. It is therefore highly desirable that no more than approximately 0.10 per cent, by weight, of the organopolysiloxane, based on the weight of the synthetic rubber base stock, be employed to decrease the sticking of the synthetic rubber to the rolls. In most instances, only a few drops of the liquid organopolysiloxane need be incorporated for about each one-half pound of the synthetic rubber which is being rolled on the milling rolls. Besides aiding in the processing of the synthetic rubber, the liquid organopolysiloxane present in the base stock acts as a lubricant during molding of the rubber. This eliminates the necessity for adding other lubricating materials to the rubber, or coating the mold with a lubricant prior to the molding operation.

It is understood by those skilled in the art, that the various temperature ranges ordinarily found applicable for rolling the synthetic rubber on differential rolls may also be used in place of the temperature employed in the foregoing examples. At higher temperatures, e. g., from 40 to 50° C., the tendency of the synthetic rubber to stick excessively to the rolls is usually increased. Under such circumstances, the presence of the liquid organopolysiloxane will materially reduce this tendency to a more desirable degree.

What I claim as new and desire to secure by Letters Patent of the United States is.

1. In the process of dry-milling a solid synthetic rubber selected from the class consisting of homopolymers of butadiene, copolymers of butadiene and styrene, copolymers of butadiene and acrylonitrile, copolymers of butadiene and a preponderant proportion of isobutylene, polymers of 2-chloro-1,3-butadiene, and rubbery polymeric condensation products of organic dihalides and inorganic polysulfides, the step for reducing the stickiness during processing on milling rolls of the synthetic rubber, without reducing the tackiness, which step comprises intimately dispersing in the synthetic rubber an amount of a liquid, oily, non-resinous hydrocarbon-substituted polysiloxane containing from 1.98 to less than 3.0 hydrocarbon radicals per silicon atom and equal to from 0.01 to 0.10 per cent, by weight, of the synthetic rubber, the said hydrocarbon radicals being attached to the silicon atoms by carbon-silicon linkages and being selected from the class consisting of alkyl, aryl, aralkyl, and alkaryl radicals.

2. In the process of dry-milling a solid synthetic rubber selected from the class consisting of homopolymers of butadiene, copolymers of butadiene and styrene, copolymers of butadiene and acrylonitrile, copolymers of butadiene and a preponderant proportion of isobutylene, polymers of 2-chloro-1,3-butadiene and rubbery polymeric condensation products of organic dihalides and inorganic polysulfides, the step for reducing the stickiness during processing on milling rolls of the synthetic rubber, without reducing the tackiness, which step comprises incorporating in the synthetic rubber an amount of a liquid, oily, non-resinous methyl polysiloxane containing an average of from 1.98 to less than 3.0 methyl groups per silicon atom and corresponding to from 0.01 to 0.10 per cent, by weight, of the synthetic rubber, the methyl groups in the methyl polysiloxane being attached to the silicon atoms by carbon-silicon linkages.

3. In the process of dry-milling a solid synthetic rubber, the step for reducing the stickiness during processing on milling rolls of the synthetic rubber comprising the product of polymerization of a mixture comprising butadiene and styrene, without reducing the tackiness of said rubber, which step comprises incorporating in the synthetic rubber a liquid, oily, non-resinous organopolysiloxane containing from 1.98 to less than 3.0 hydrocarbon groups per silicon atom in an amount corresponding to from 0.01 to 0.10 per cent, by weight, based on the weight of the synthetic rubber, the said hydrocarbon groups being attached to the silicon atoms by carbon-silicon linkages and being selected from the class consisting of alkyl, aryl, aralkyl, and alkaryl radicals.

4. In the process of dry-milling a solid synthetic rubber, the step for reducing the stickiness during processing on milling rolls of the synthetic rubber comprising the product of polymerization of a mass containing butadiene and acrylonitrile, without reducing the tackiness of said rubber, which step comprises incorporating in the synthetic rubber a liquid, oily, non-resinous organopolysiloxane containing from 1.98 to less than 3.0 hydrocarbon groups per silicon atom and present in an amount corresponding to from 0.01 to 0.10 per cent, by weight, of the synthetic rubber, said hydrocarbon groups being attached to the silicon atoms by carbon-silicon linkages and being selected from the class consisting of alkyl, aryl, aralkyl, and alkaryl radicals.

5. In the process of dry-milling a solid synthetic rubber, the step for reducing the stickiness during processing on milling rolls of the synthetic rubber comprising the product of polymerization of a mass comprising 2-chloro-1,3-butadiene, without reducing the tackiness of said rubber, which step comprises incorporating in the synthetic rubber a liquid, oily, non-resinous hydrocarbon-substituted polysiloxane containing from 1.98 to less than 3.0 hydrocarbon groups per silicon atom and present in an amount corresponding to from 0.01 to 0.10 per cent, by weight, of the synthetic rubber, the said hydrocarbon groups being attached to the silicon atoms by carbon-silicon linkages and being selected from the class consisting of alkyl, aryl, aralkyl, and alkaryl radicals.

6. The process as in claim 3 wherein the liquid hydrocarbon-substituted polysiloxane is a liquid methyl polysiloxane containing from 1.98 to 2.0 methyl groups per silicon atom attached to the aforesaid silicon atoms by carbon-silicon linkages.

7. The process as in claim 4 wherein the liquid hydrocarbon-substituted polysiloxane is a liquid methyl polysiloxane containing from 1.98 to 2.0 methyl groups per silicon atom attached to the aforesaid silicon atoms by carbon-silicon linkages.

8. The process as in claim 5 wherein the liquid hydrocarbon-substituted polysiloxane is a liquid methyl polysiloxane containing from 1.98 to 2.0 methyl groups per silicon atom and attached to the aforesaid silicon atoms by carbon-silicon linkages.

MOYER M. SAFFORD.

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,375,007 | Larsen | May 1, 1945 |
| 2,467,708 | Sturgis | Apr. 19, 1949 |
| 2,470,772 | Haas | May 24, 1949 |
| 2,472,495 | Sparks et al. | June 7, 1949 |
| 2,482,307 | Walker et al. | Sept. 20, 1949 |

OTHER REFERENCES

Barron: "Synthetic Rubbers Nomenclature," The Rubber Age, October 1942, pages 177–178.